(12) United States Patent
Kalu et al.

(10) Patent No.: US 8,610,684 B2
(45) Date of Patent: Dec. 17, 2013

(54) SYSTEM AND METHOD FOR CONTROLLING AN ELECTRONIC DEVICE HAVING A TOUCH-SENSITIVE NON-DISPLAY AREA

(75) Inventors: Kalu Onuka Kalu, Waterloo (CA); Laura Mahan, Kanata (CA)

(73) Assignee: BlackBerry Limited, Waterloo (CA)

( * ) Notice: Subject to any disclaimer, the term of this patent is extended or adjusted under 35 U.S.C. 154(b) by 167 days.

(21) Appl. No.: 13/273,936

(22) Filed: Oct. 14, 2011

(65) Prior Publication Data

US 2013/0093685 A1 Apr. 18, 2013

(51) Int. Cl.
*G06F 3/033* (2013.01)

(52) U.S. Cl.
USPC .......................................... 345/173; 715/863

(58) Field of Classification Search
None
See application file for complete search history.

(56) References Cited

U.S. PATENT DOCUMENTS

| | | |
|---|---|---|
| 7,088,344 B2 | 8/2006 | Maezawa et al. |
| 2008/0273018 A1 | 11/2008 | Woolley et al. |
| 2009/0264157 A1 | 10/2009 | Hsieh et al. |
| 2010/0164959 A1 | 7/2010 | Brown et al. |
| 2011/0128446 A1 | 6/2011 | Woo |
| 2011/0169749 A1 | 7/2011 | Ganey et al. |
| 2011/0209099 A1 | 8/2011 | Hinckley et al. |
| 2011/0225553 A1 | 9/2011 | Abramson et al. |
| 2012/0249429 A1* | 10/2012 | Anderson et al. ............. 345/173 |
| 2012/0249443 A1* | 10/2012 | Anderson et al. ............. 345/173 |
| 2012/0249595 A1* | 10/2012 | Feinstein ....................... 345/642 |

FOREIGN PATENT DOCUMENTS

EP     2003539 A1    12/2008

OTHER PUBLICATIONS

Mouton, B.; Partial Search Report from corresponding European Application No. 11185289.3; search completed Apr. 25, 2012.

* cited by examiner

*Primary Examiner* — Van Chow
(74) *Attorney, Agent, or Firm* — Brett J. Slaney; Blake, Cassels & Graydon LLP

(57) ABSTRACT

A method and system are provided for controlling a first electronic device connectable to a second electronic device. The first electronic device comprises a touch-sensitive non-display area for detecting one or more touch-sensitive non-display area gestures. Each touch-sensitive non-display area gesture is associated with a respective function of the first electronic device. The method comprises partitioning a touch-sensitive input mechanism of the second electronic device into a non-display portion and a display portion; receiving a gesture using the non-display portion, the gesture corresponding to a touch-sensitive non-display area gesture; and determining an instruction to be performed by the first electronic device based on the gesture.

48 Claims, 17 Drawing Sheets

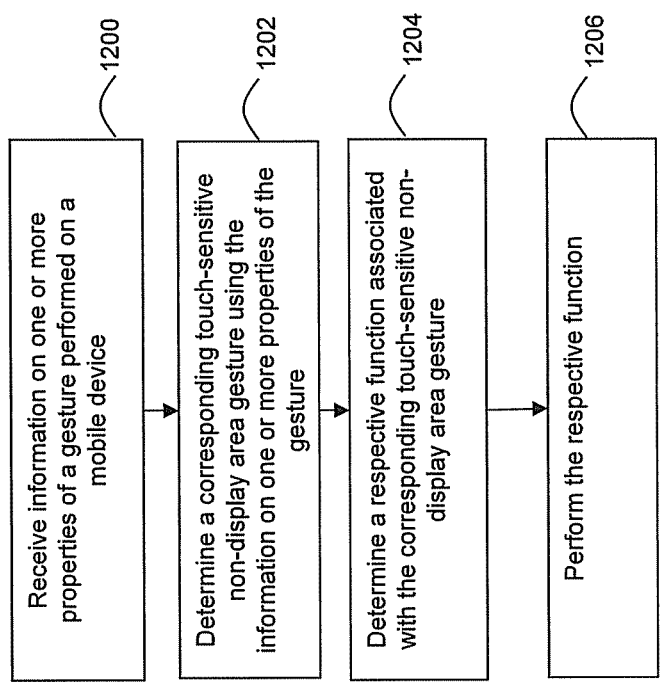

SYSTEM AND METHOD FOR CONTROLLING AN ELECTRONIC DEVICE HAVING A TOUCH-SENSITIVE NON-DISPLAY AREA

TECHNICAL FIELD

The following relates generally to controlling an electronic device having a touch-sensitive non-display area.

DESCRIPTION OF THE RELATED ART

Many electronic devices, including mobile devices, include one or more touch-sensitive components such as a touch-sensitive display or a trackpad to provide inputs to the electronic device. The user can provide an input to the touch-sensitive component using an object (e.g. a finger of a user or a stylus) to perform a gesture near or directly on the surface of the touch-sensitive component. For example, the gesture can include tapping an object onto a touch-sensitive display or swiping the object across a portion of the touch-sensitive display in a direction. Other gestures can include more than one object (e.g., two fingers of a user). For example, a gesture can include placing two objects on a touch-sensitive display and bringing the objects closer together to perform a "pinching" gesture.

BRIEF DESCRIPTION OF THE DRAWINGS

Embodiments will now be described by way of example only with reference to the appended drawings wherein:

FIG. 13 is a flow diagram of another example of computer executable instructions for controlling an electronic device having a touch-sensitive non-display portion.

DETAILED DESCRIPTION

Figure 1:
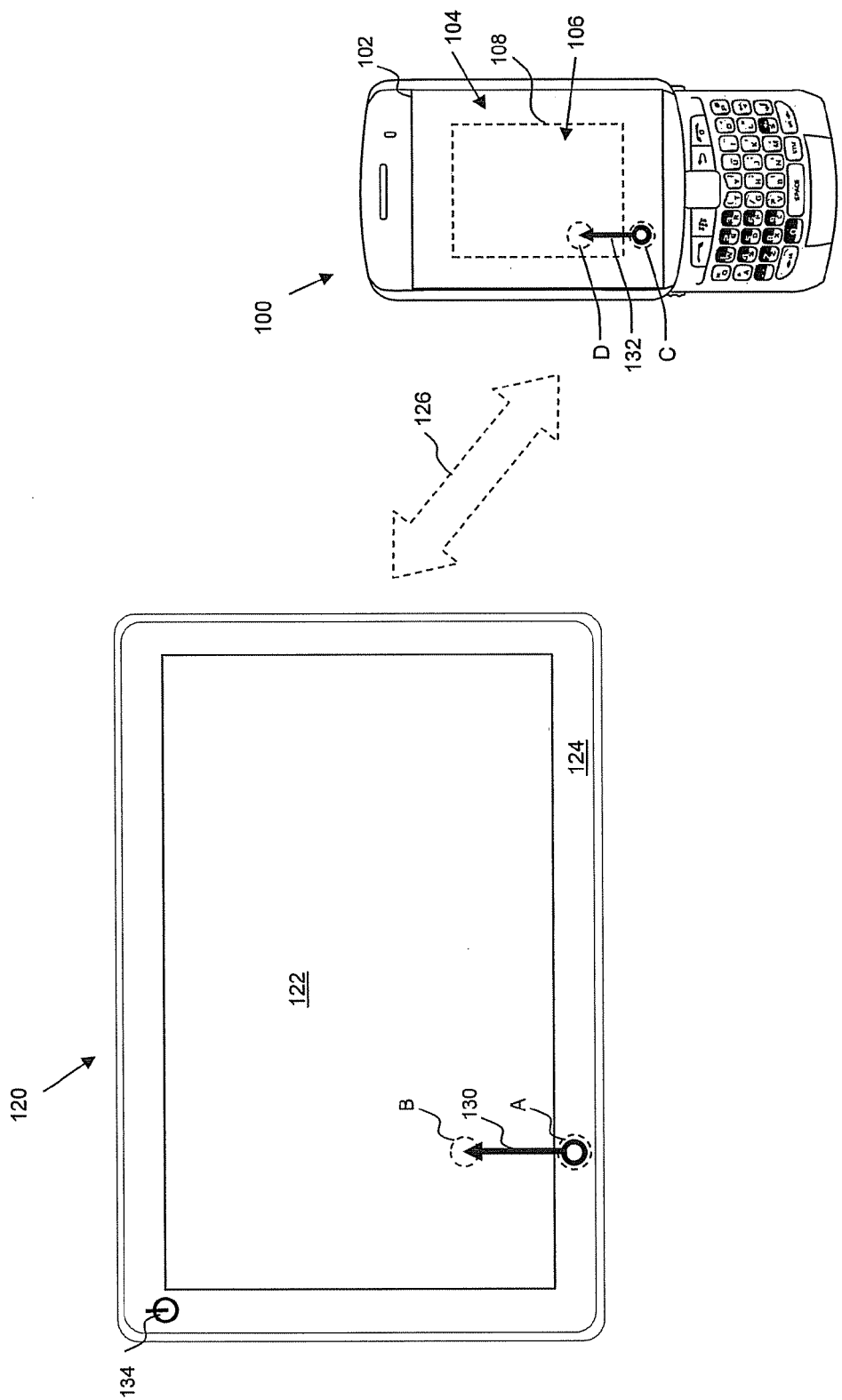
FIG. 1 is a plan view of an example embodiment of a mobile device in communication with a second electronic device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

Recently, mobile devices such as tablet computers and the like may include a touch-sensitive non-display area surrounding a display area for receiving inputs in the form of gestures using the touch-sensitive non-display area. It has been recognized that methods to access the functions of a touch-sensitive non-display area of an electronic device are typically limited to performing gestures directly on the touch-sensitive non-display area. To address this, the following describes a method, computer readable storage medium and a mobile device operable to control a first electronic device connectable to a second electronic device. The first electronic device has a touch-sensitive non-display area for detecting one or more touch-sensitive non-display area gestures. Each touch-sensitive non-display area gesture is associated with a respective function of the first electronic device. The method comprises: partitioning a touch-sensitive input mechanism of the second electronic device into a non-display portion and a display portion; receiving a gesture using the non-display portion, the gesture corresponding to a touch-sensitive non-display area gesture; and determining an instruction to be performed by the first electronic device based on the gesture. The method may also include providing the instruction to the first electronic device for performing the instruction.

The following also describes a method of controlling a first electronic device connectable to a second electronic device. The first electronic device has a touch-sensitive non-display area for detecting at least one touch-sensitive non-display area gesture interacting with the touch-sensitive non-display area. The method comprises: receiving an input from the second electronic device, the input representing one of the at least one touch-sensitive non-display area gesture; and executing a function corresponding to the one of the at least one touch-sensitive non-display area gesture.

Referring to FIG. 1, a plan view of an example embodiment of a mobile device 100 in communication with a second electronic device 120 via a wireless connection 126 (such as Bluetooth, Infrared, Wi-Fi, etc.) is provided. In this example, the second electronic device 120 includes a touch-sensitive non-display area 124 surrounding a touch-sensitive display area 122. The second electronic device can also have one or more physical or virtual buttons 134 (such as a power button) placed on or within the touch-sensitive non-display area 124. The touch-sensitive non-display area 124 can receive inputs in the form of gestures involving the touch-sensitive non-display area 124. A touch-sensitive non-display area gesture may include a swiping or pinching gesture contained completely within the touch-sensitive non-display area 124. In another example, a touch-sensitive non-display area gesture may include a gesture that interacts with the touch-sensitive non-display area 124 during a portion of the gesture. For example, a touch-sensitive non-display area gesture may include a swipe that crosses an interface between the touch-sensitive non-display area 124 and touch-sensitive display area 122.

In FIG. 1, an example touch-sensitive non-display area gesture 130 is shown, wherein the second electronic device 120 detects a gesture that involves a swiping motion from within the touch-sensitive non-display area 124 at point A and onto the touch-sensitive display area 122 at point B. The touch-sensitive non-display area gesture 130 can be associated with a respective function of the second electronic device 120 such that the second electronic device 120 is operable to perform the respective function after detecting the touch-sensitive non-display area gesture 130. For example, the respective function of a touch-sensitive non-display area gesture 130 comprising swiping from the bottom of the of the touch-sensitive non-display area 124 onto the touch-sensitive display area 122 can cause the second electronic device 120 to minimize one or more open applications. In another example, the respective function of a touch-sensitive non-display area gesture 130 comprising swiping from within an application displayed on the touch-sensitive display area 122 onto the touch-sensitive non-display area 124 can cause the second electronic device 120 to close the application. Other examples of respective functions associated with a touch-sensitive non-display area gesture 130 include minimizing or maximizing an application, showing or hiding a menu, status bar or virtual keyboard, switching between one or more applications, turning off the second electronic device 120, etc.

The mobile device 100 in this example also includes a touch-sensitive display area 102 that can detect inputs in the form of gestures on the touch-sensitive display area 102. In the example shown in FIG. 1, the mobile device 100 partitions the touch-sensitive display area 102 into a non-display portion 104 and display portion 106, separated by a boundary 108 to mimic the touch-sensitive display area 122 and the touch-sensitive non-display area 124 of the second electronic device 120. The mobile device 100 can be operable to map a gesture 130 that uses the non-display portion 104 of the mobile device 100 to a corresponding touch-sensitive non-display area gesture 130 of the second electronic device 120. For example, the gesture 132 received by the touch-sensitive display area 102 by swiping from within the non-display portion 104 at point C onto the display portion 106 at point D may correspond to the touch-sensitive non-display area gesture 130 illustrated on the second electronic device 120. Upon receiving gesture 132, the mobile device 100 can instruct the second electronic device 120 to perform the respective function associated with the corresponding touch-sensitive non-display area gesture 130 as if the touch-sensitive non-display area gesture 130 was performed using the touch-sensitive non-display area 124.

It can therefore be seen that second electronic device 120 can be remotely controlled by the mobile device 100 without losing the functionality of the touch-sensitive non-display area 124 and without requiring touch-sensitive non-display area gestures 130 to be applied on the touch-sensitive non-display area 124. As discussed below, the mobile device 100 can be configured to control the second electronic device 120 in various ways when a gesture 132 is received by the mobile device 100 that uses the non-display portion 104. As also discussed below other devices in communication with the second electronic device 120 can be used to effect a corresponding touch-sensitive non-display area gesture 130 using an input mechanism provided by the other device.

Examples of applicable mobile electronic devices may include, without limitation, cellular phones, smart-phones, tablet computers, wireless organizers, personal digital assistants, computers, laptops, handheld wireless communication devices, wirelessly enabled notebook computers, portable gaming devices, and the like. Such devices will hereinafter be commonly referred to as "mobile devices" 100 for the sake of clarity. It will however be appreciated that the principles described herein are also suitable to other electronic devices, e.g. "non-mobile" devices. For example, the principles herein are equally applicable to personal computers (PCs), tabletop computing devices, wall-mounted screens such as kiosks, or any other computing device. It will further be appreciated that the second electronic device 120 can be a mobile device 100.

The mobile device 100 may be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 2:
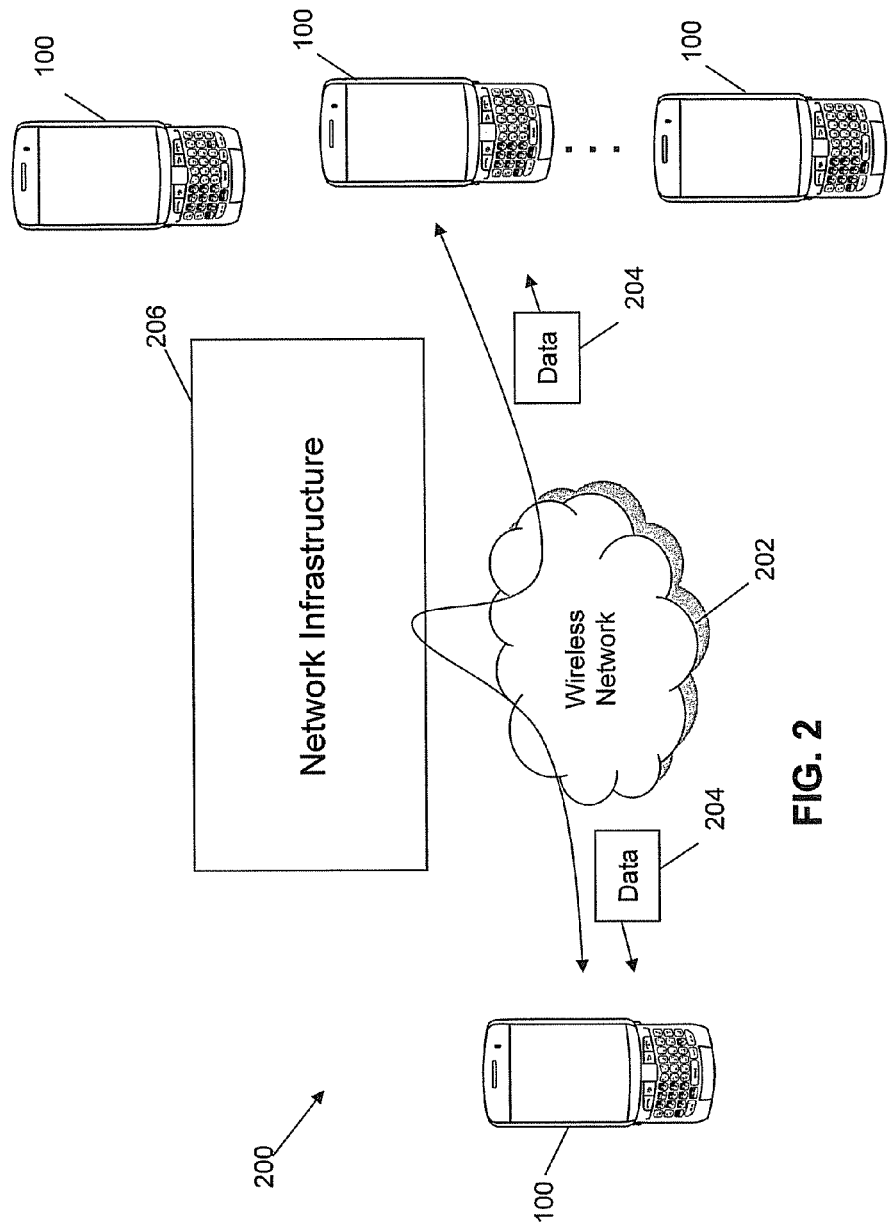
FIG. 2 is a block diagram of an example of a wireless communication system.

Referring to FIG. 2, an example communication system 200 is shown. The communication system 200, in this example, enables, at least in part, mobile devices 100 to communicate with each other via a wireless network 202. For example, as shown, data 204 may be exchanged between various mobile devices 100. Data 204 that is sent from one mobile device 100 to another mobile device 100 may be transmitted according to a particular messaging or communication medium, protocol, or other mechanism. For example, as shown in FIG. 2, data 204 may be sent over the wireless network 202 via a component of a network infrastructure 206. The network infrastructure 206 can include various systems that may be used by the mobile devices 100 to exchange data 204. For example, a peer-to-peer (P2P) system, a short message service centre (SMSC), an email system (e.g. web-based, enterprise based, or otherwise), a web system (e.g. hosting a website or web service), a host system (e.g. enterprise server), and social networking system may be provided by or within or be otherwise supported or facilitated by the network infrastructure 206. The mobile devices 100 may therefore send data to or receive data from other mobile devices 100 via one or more particular systems with which the mobile devices 100 are communicable via the wireless network 202 and network infrastructure 206.

To aid the reader in understanding an example configuration of the mobile device 100, reference will now be made to FIG. 3.

Figure 3:
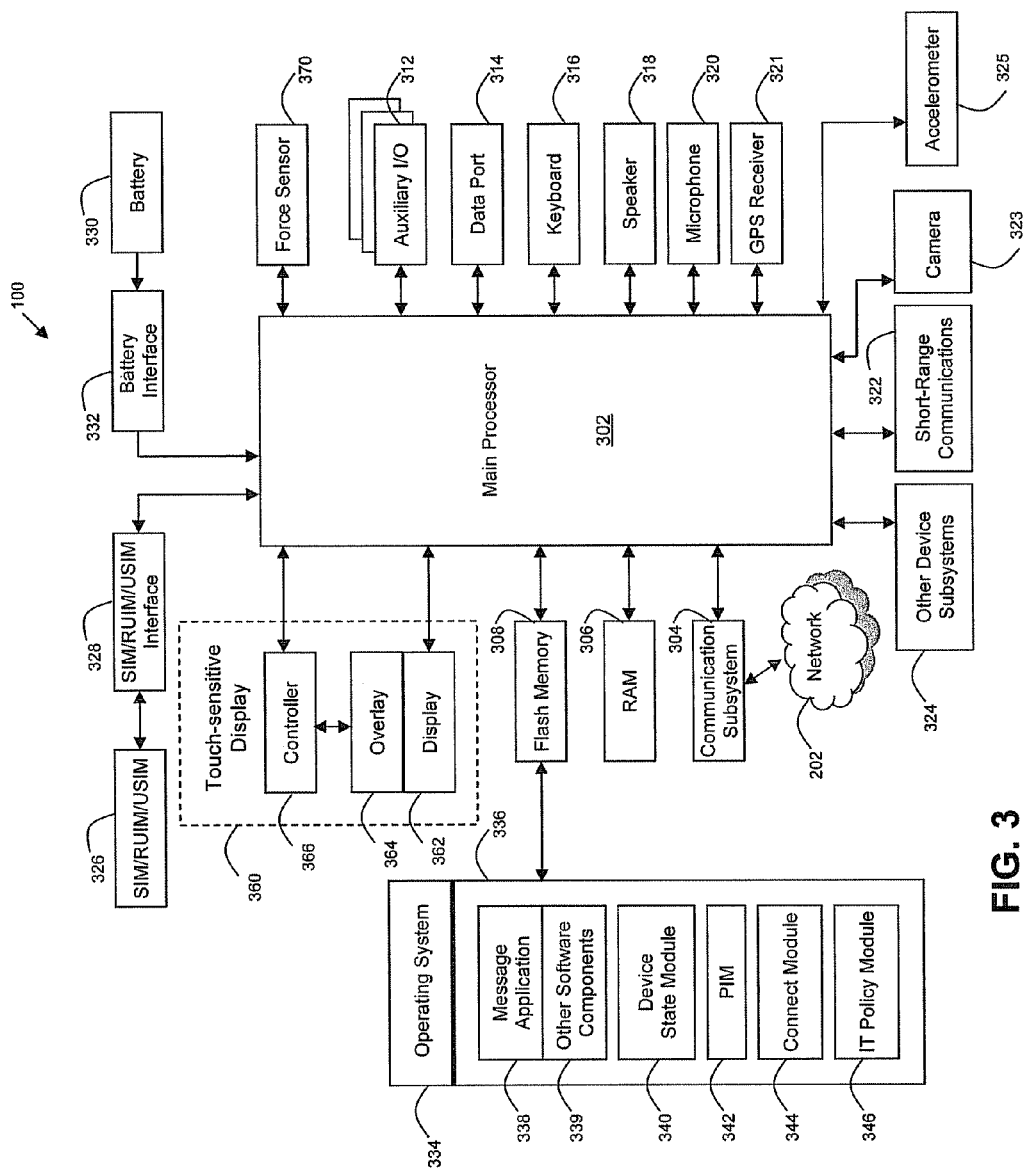
FIG. 3 is a block diagram of an example embodiment of a mobile device.

Referring to FIG. 3, shown therein is a block diagram of an example embodiment of a mobile device 100. The mobile device 100 includes a number of components such as a main processor 302 that controls the overall operation of the mobile device 100. Communication functions, including data and voice communications, are performed through a communication subsystem 304. The communication subsystem 304 receives messages from and sends messages to a wireless network 202. In this example embodiment of the mobile device 100, the communication subsystem 304 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 304 with the wireless network 202 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316, a speaker 318, a microphone 320, a GPS receiver 321, short-range communications 322, a camera 323, a accelerometer 325 and other device subsystems 324. Some of the subsystems of the mobile device 100 perform communication-related functions, whereas other subsystems may provide "resident" or on-device functions. By way of example, the display 360 and the keyboard 316 may be used for both communication-related functions, such as entering a text message for transmission over the network 202, and device-resident functions such as a calculator or task list. In one embodiment, the mobile device 100 can include a non touch-sensitive display in place of, or in addition to the touch-sensitive display 360. For example the touch-sensitive display 360 can be replaced by a display 362 that may not have touch-sensitive capabilities.

The mobile device 100 can send and receive communication signals over the wireless network 202 after required network registration or activation procedures have been completed. Network access is associated with a subscriber or user of the mobile device 100. To identify a subscriber, the mobile device 100 may use a subscriber module component or "smart card" 326, such as a Subscriber Identity Module (SIM), a Removable User Identity Module (RUIM) and a Universal Subscriber Identity Module (USIM). In the example embodiment shown, a SIM/RUIM/USIM 326 is to be inserted into a SIM/RUIM/USIM interface 328 in order to communicate with a network. Without the component 326, the mobile device 100 is not fully operational for communication with the wireless network 202. Once the SIM/RUIM/USIM 326 is inserted into the SIM/RUIM/USIM interface 328, it is coupled to the main processor 302.

The mobile device 100 is typically a battery-powered device and includes a battery interface 332 for receiving one or more rechargeable batteries 330. In at least some example embodiments, the battery 330 can be a smart battery with an embedded microprocessor. The battery interface 332 is coupled to a regulator (not shown), which assists the battery 330 in providing power to the mobile device 100. Although current technology makes use of a battery, future technologies such as micro fuel cells may provide the power to the mobile device 100.

The mobile device 100 also includes an operating system 334 and software components 336 to 346 which are described in more detail below. The operating system 334 and the software components 336 to 346 that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 346, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 100 during its manufacture. Software applications may include a message application 338, a device state module 340, a Personal Information Manager (PIM) 342, a connect module 344 and an IT policy module 346. A message application 338 can be any suitable software program that allows a user of the mobile device 100 to send and receive electronic messages, wherein messages are typically stored in the flash memory 308 of the mobile device 100. A device state module 340 provides persistence, i.e. the device state module 340 ensures that important device data is stored in persistent memory, such as the flash memory 308, so that the data is not lost when the mobile device 100 is turned off or loses power. A PIM 342 includes functionality for organizing and managing data items of interest to the user, such as, but not limited to, e-mail, contacts, calendar events, and voice mails, and may interact with the wireless network 202. A connect module 344 implements the communication protocols that are required for the mobile device 100 to communicate with the wireless infrastructure and any host system, such as an enterprise system, that the mobile device 100 is authorized to interface with. An IT policy module 346 receives IT policy data that encodes the IT policy, and may be responsible for organizing and securing rules such as the "Set Maximum Password Attempts" IT policy.

Other types of software applications or components 339 can also be installed on the mobile device 100. These software applications 339 can be pre-installed applications (i.e. other than message application 338) or third party applications, which are added after the manufacture of the mobile device 100. Examples of third party applications include games, calculators, utilities, etc.

The additional applications 339 can be loaded onto the mobile device 100 through at least one of the wireless network 202, the auxiliary I/O subsystem 312, the data port 314, the short-range communications subsystem 322, or any other suitable device subsystem 324.

The data port 314 can be any suitable port that enables data communication between the mobile device 100 and another computing device. The data port 314 can be a serial or a parallel port. In some instances, the data port 314 can be a USB port that includes data lines for data transfer and a supply line that can provide a charging current to charge the battery 330 of the mobile device 100.

For voice communications, received signals are output to the speaker 318, and signals for transmission are generated by the microphone 320. Although voice or audio signal output is accomplished primarily through the speaker 318, the display 360 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover.

The capacitive touch sensor layers may be any suitable material, such as patterned indium tin oxide (ITO).

The display 362 of the touch-sensitive display 360 may include a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. The controller 366 and/or the processor 302 may detect a touch by any suitable contact member on the touch-sensitive display 360. Similarly, multiple simultaneous touches, are detected.

One or more gestures are also detected by the touch-sensitive display 360. A gesture is a particular type of touch on a touch-sensitive display 360 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically comprises an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality. An example of a meta-navigation gesture is the touch-sensitive non-display area gesture 130 of FIG. 1.

In some example embodiments, an optional force sensor 370 or force sensors is disposed in any suitable location, for example, between the touch-sensitive display 360 and a back of the mobile device 100 to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 4:
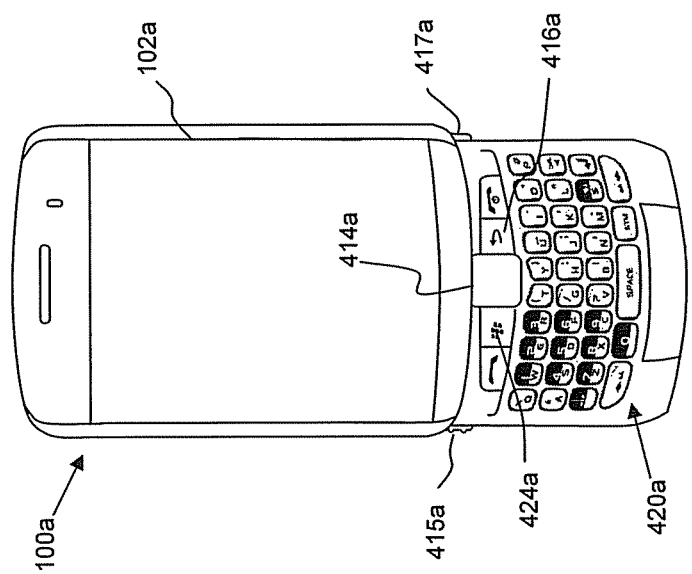
FIG. 4 is a plan view of an example of a mobile device.
Figure 5:
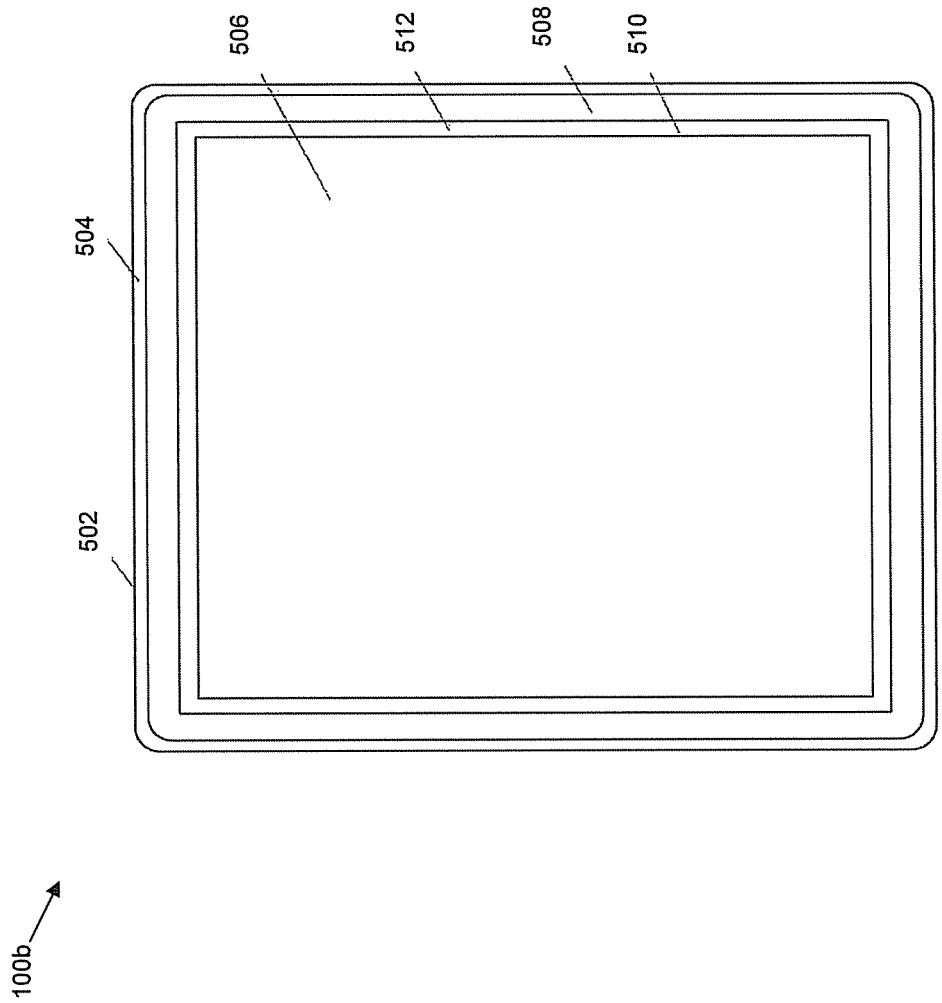
FIG. 5 is a plan view of another example of a mobile device.

Referring to FIGS. 4 and 5, one example of a mobile device 100a is shown in FIG. 4 and another example of a mobile device 100b is shown in FIG. 5. It will be appreciated that the numeral "100" will hereinafter refer to any mobile device 100, including the example embodiments 100a and 100b, those example embodiments enumerated above or otherwise. It will also be appreciated that a similar numbering convention may be used for other general features common between all figures. It will also be appreciated that the principles discussed herein may equally apply wherein at least one electronic device may be considered a "non-mobile" device.

The mobile device 100a shown in FIG. 4 includes a touch-sensitive display area 102a and a cursor or positioning device, which in this example is in the form of a trackpad 414a. In this example, the touch-sensitive display area 102a can span the entire touch-sensitive display 360. The trackpad 414a permits multi-directional positioning of a selection indicator or cursor that can be displayed on the touch-sensitive display area 102a such that the selection cursor can be moved in upward, downward, leftward and rightward directions and, if desired and/or permitted, in various other directions such as a diagonal direction. A selection cursor may include a box, alteration of an icon or any combination of features that enable the user to identify the currently chosen icon or item. The trackpad 414a in this example embodiment is situated on the front face of a housing for mobile device 100a to enable a user to manoeuvre the trackpad 414a while holding the mobile device 100a in one hand. The trackpad 414a may serve as another input member (in addition to a directional or positioning member) to provide selection inputs to a processor of the mobile device and can preferably be pressed in a direction towards the housing of the mobile device 100a to provide such a selection input. It will be appreciated that the trackpad 414a is only one example embodiment of a suitable positioning device. For example, a trackball, touch-sensitive display area, OLED, or other input mechanism may equally apply.

The mobile device 100a in FIG. 4 also includes a programmable convenience button 415a to activate a selection application such as, for example, a calendar or calculator. Further, mobile device 100a also includes an escape or cancel button 416a, a camera button 417a, a menu or option button 424a and a keyboard 420a. The camera button 417a is able to activate photo and video capturing functions, e.g. when pressed in a direction towards the housing. The menu or option button 424a can be used to load a menu or list of options on the display 102a when pressed. In this example, the escape or cancel button 416a, the menu option button 424a, and a keyboard 420a are disposed on the front face of the mobile device housing, while the convenience button 415a and camera button 417a are disposed at the side of the housing. This button placement enables a user to operate these buttons while holding the mobile device 100a in one hand. The keyboard 420a is, in this example embodiment, a standard QWERTY keyboard, however, it will be appreciated that reduced QWERTY or virtual keyboards (e.g. as provided by a touch-sensitive display area) may equally apply.

It will be appreciated that for the mobile device 100, a wide range of one or more positioning or cursor/view positioning mechanisms such as a touch/track pad, a positioning wheel, a joystick button, a mouse, a touch-screen, a set of arrow keys, a tablet, an accelerometer (for sensing orientation and/or movements of the mobile device 100 etc.), OLED, or other whether presently known or unknown may be employed. Similarly, any variation of keyboard 420a may be used. It will also be appreciated that the mobile devices 100 shown in FIGS. 4 and 5 are for illustrative purposes only and various other mobile devices 100 are equally applicable to the following example embodiments. Other buttons may also be disposed on the mobile device housing such as colour coded "Answer" and "Ignore" buttons to be used in telephonic communications.

A front view of an example of the mobile device 100b is shown in FIG. 5. The mobile device 100b includes a housing 502 that encloses components such as shown in FIG. 3. The housing 502 may include a back, sidewalls, and a front 504 that frames the touch-sensitive display 360. The example mobile device 100b shown in FIG. 5 can represent a portable tablet computer or device.

In the shown example of FIG. 5, the touch-sensitive display 360 is generally centered in the housing 502 such that a display area 506 of the touch-sensitive overlay 364 is generally centered with respect to the front 504 of the housing 502. The non-display area 508 of the touch-sensitive overlay 364 extends around the display area 506. In the presently described embodiment, the width of the non-display area is 4 mm. In one example, the touch-sensitive display area 122 and the touch-sensitive non-display area 124 of FIG. 1 can be implemented as a display area 506 of the touch-sensitive overlay 364 and a non-display area 508 of the touch-sensitive overlay 364, respectively.

For the purpose of the present example, the touch-sensitive overlay 364 extends to cover the display area 506 and the non-display area 508. Touches on the display area 506 may be detected and, for example, may be associated with displayed selectable features. Touches on the non-display area 508 may be detected, for example, to detect a meta-navigation gesture. Alternatively, meta-navigation gestures may be determined by both the non-display area 508 and the display area 506. The density of touch sensors may differ from the display area 506 to the non-display area 508. For example, the density of nodes in a mutual capacitive touch-sensitive display, or density of locations at which electrodes of one layer cross over electrodes of another layer, may differ between the display area 506 and the non-display area 508.

Gestures received on the touch-sensitive display 360 may be analyzed based on the attributes to discriminate between meta-navigation gestures and other touches, or non-meta navigation gestures. Meta-navigation gestures may be identified when the gesture crosses over a boundary near a periphery of the display 362, such as a boundary 510 between the display area 506 and the non-display area 508. In the example of FIG. 5, the origin point of a meta-navigation gesture may be determined utilizing the area of the touch-sensitive overlay 364 that covers the non-display area 508.

A buffer region 512 or band that extends around the boundary 510 between the display area 506 and the non-display area 508 may be utilized such that a meta-navigation gesture is identified when a touch has an origin point outside the boundary 510 and the buffer region 512 and crosses through the buffer region 512 and over the boundary 510 to a point inside the boundary 510. Although illustrated in FIG. 5, the buffer region 512 may not be visible. Instead, the buffer region 512 may be a region around the boundary 510 that extends a width that is equivalent to a predetermined number of pixels, for example. Alternatively, the boundary 510 may extend a predetermined number of touch sensors or may extend a predetermined distance from the display area 506. The boundary 510 may be a touch-sensitive region or may be a region in which touches are not detected.

Gestures that have an origin point in the buffer region 512, for example, may be identified as non-meta navigation gestures. Optionally, data from such gestures may be utilized by an application as a non-meta navigation gesture. Alternatively, data from such gestures may be discarded such that touches that have an origin point on the buffer region 512 are not utilized as input at the mobile device 100.

Figure 6:
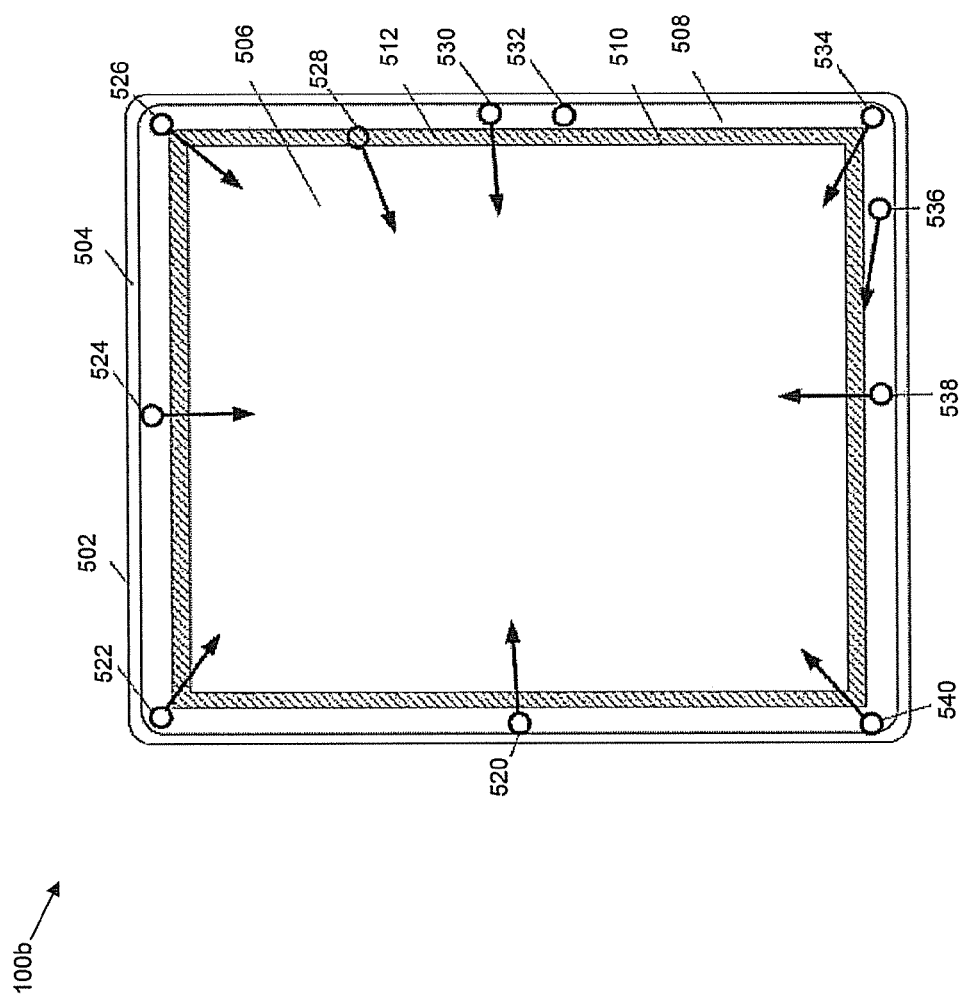
FIG. 6 is a plan view of examples of touches on the mobile device of FIG. 5.

FIG. 6 illustrates examples of touches on the touch-sensitive display 360. The buffer region 512 is illustrated in FIG. 6 by hash markings for the purpose of explanation. As indicated, the buffer region 512 may not be visible to the user. For the purpose of explanation, touches are illustrated by circles at their points of origin. Arrows extending from the circles illustrate the paths of the touches that are gestures.

The touch 538 begins at the origin point outside the boundary 510 and outside the buffer region 512. The path of the touch 538 crosses the buffer region 512 and the boundary 510 and is therefore identified as a meta-navigation gesture. Similarly, the touches 520, 530, 524, 522, 526, 540, 534 each have origin points outside the boundary 510 and the buffer region 512 and their paths cross the buffer region 512 and the boundary 510. Each of the touches 520, 530, 524, 522, 526, 540, 534 is therefore identified as a meta-navigation gesture. The touch 528, however, has an origin point that falls within the buffer region 512 and the touch 528 is therefore not identified as a meta-navigation gesture. The touch 536 begins at an origin point outside the boundary 510 and the buffer region 512. The path of the touch 536, however, does not cross the boundary 510 and is therefore not identified as a meta-navigation gesture. The touch 532 also has an origin point outside the boundary 510 and the buffer region 512 but is not a gesture and therefore does not cross the boundary 510 and is not identified as a meta-navigation gesture.

Figure 7:
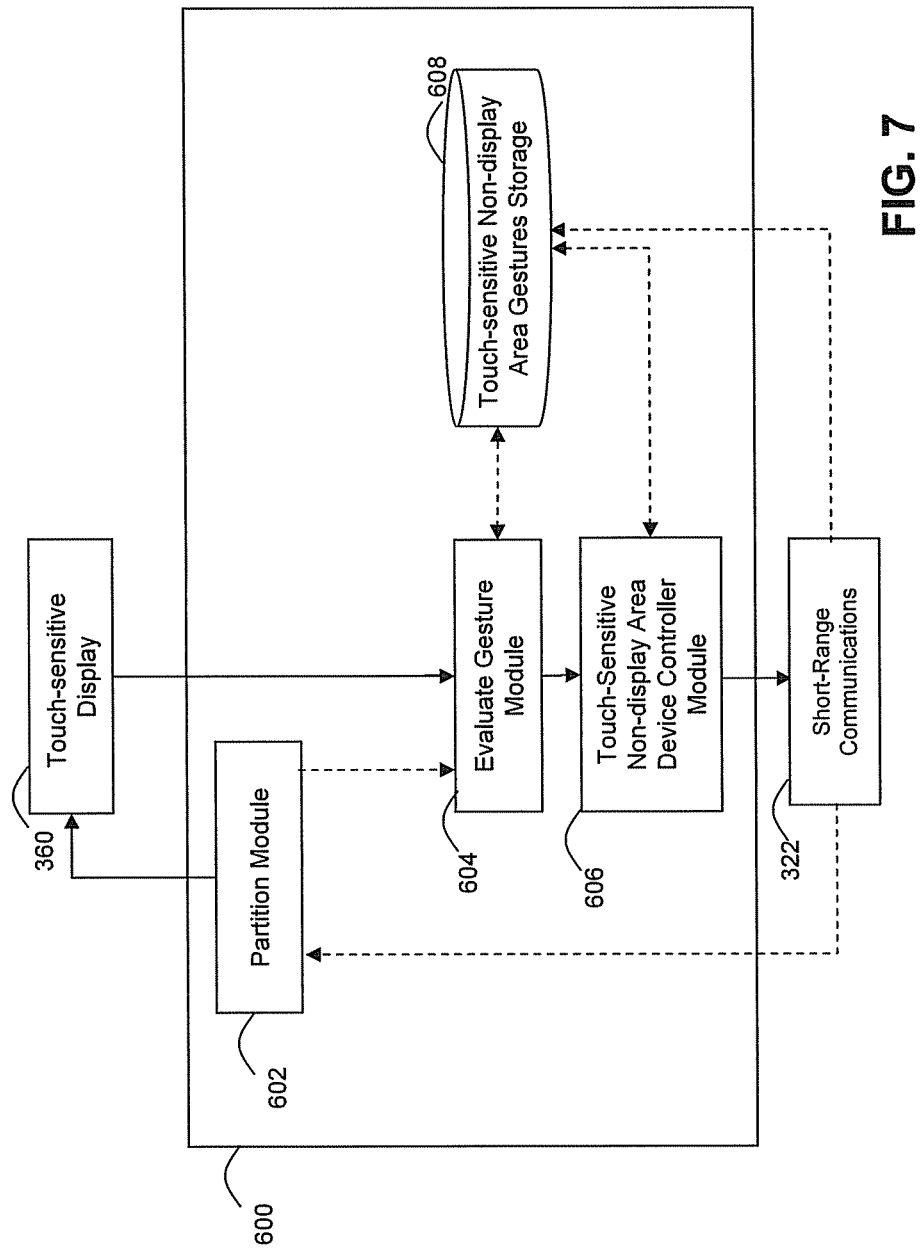
FIG. 7 is a block diagram of an example of a configuration of a touch-sensitive non-display area device controller.

Referring to FIG. 7, an example of a configuration for a touch-sensitive non-display area device controller application 600 (herein referred to as a "device controller application 600") is provided. The device controller application 600 can be one of the other software applications 339 of FIG. 3 that can be loaded on the mobile device 100. The device controller application 600 can request details of activity occurring in, or receive inputs from, a component that receives gestures 132 such as a touch-sensitive display 360.

The device controller application 600 can also receive information from and send information to the second electronic device 120 via a communication subsystem of the mobile device 100. In the example configuration of FIG. 7, a short range communications subsystem 322 (e.g. Bluetooth or Infrared) can be used to request and/or receive information related to the touch-sensitive non-display area 124 of the second electronic device 120. In one example, information related to the touch-sensitive non-display area 124 can include the shape, size, position and/or orientation of the touch-sensitive non-display area 124. In another example, information related to the touch-sensitive non-display area 124 can include information regarding the touch-sensitive non-display area gestures 130 that can be received by the touch-sensitive non-display area 130 and their respective functions. It will be appreciated that other forms of establishing a communication link between the mobile device 100 and second electronic device 120 can be used such as a USB cable, a Wi-Fi connection, etc.

The device controller application 600 in the example of FIG. 7 includes a partition module 602 for partitioning the touch-sensitive display area 102 into a non-display portion 104 and display portion 106, which is communicable with the touch-sensitive display 360. The device controller application 600 also includes an evaluate gesture module 604 for receiving and evaluating gestures performed on the touch-sensitive display area 102 from the touch-sensitive display 360, a touch-sensitive non-display area gestures storage 608 for storing and retrieving information associated with touch-sensitive non-display area gestures 130 that are supported by the second electronic device, and a device controller module 606 for determining instructions for controlling the second electronic device 120 and for sending these instructions to the communications subsystem 322.

The partition module 602 partitions the touch-sensitive display area 102 into a non-display portion 104 and display portion 106. In one example, the partition module 602 obtains information related to the second electronic device 120 such as the shape, size, position and/or orientation of the touch-sensitive non-display area 124 from the second electronic device 120 via the communications subsystem 322 for use in determining the partitions of the touch-sensitive display area 102 and/or the appearance of the non-display portion 104. The partition module 602 can also determine the visual appearance of the non-display portion 104 by instructing the touch-sensitive display 360 to display the non-display portion 104 on the touch-sensitive display area 102 according to a desired appearance.

The evaluate gesture module 604 receives a gesture 132 from the touch-sensitive display 360 and determines various information associated with the gesture 132 such as duration, start and stop positions, path, orientation, etc. In one example, the gesture 132 detected and provided by the touch-sensitive display 360 contains information regarding the gesture 132 with respect to the non-display portion 104 and display portion 106. In another example, the evaluate gesture module 604 obtains partitioning information from the partition module 602 and combines this information with the gesture 132 to determine gesture information with respect to the non-display portion 104 and display portion 106.

In an example, the evaluate gesture module 604 can access the touch-sensitive non-display area gestures storage 608 to determine a touch-sensitive non-display area gesture 130 corresponding to the gesture 132. For example, determination of a touch-sensitive non-display area gesture 130 corresponding to the gesture 132 can include comparing one or more predetermined properties of the gesture 132 and the touch-sensitive non-display area gesture 130, and locating or otherwise determining a corresponding touch-sensitive non-display area gesture 130 if the one or more properties match. The evaluate gesture module 604 can then send the information regarding the gesture 132 and corresponding touch-sensitive non-display area gesture 130 to the touch-sensitive non-display area device controller module 606. In another example, the evaluate gesture module 604 can bypass determination of the corresponding touch-sensitive non-display area gesture 130 and send information on the gesture 132 to the touch-sensitive non-display area device controller module 606.

The touch-sensitive non-display area device controller module 606 (herein referred to as the "device controller module 606") receives information regarding a gesture 132 and/or a corresponding touch-sensitive non-display area gesture 130 and uses this information to determine instructions for controlling the second electronic device 120. In one example, the device controller module 606 can look up the corresponding touch-sensitive non-display area gesture 130 in the touch-sensitive non-display area gestures storage 608 to determine its respective function. In this embodiment, the device controller module 606 may then provide instructions via the communications subsystem 322 to the second electronic device 120 to perform the respective function of the corresponding touch-sensitive non-display area gesture 130.

In another example, the device controller module 606 can instruct the second electronic device 120 to use the information related to the gesture 132 directly, in order to determine a corresponding touch-sensitive non-display area gesture 130, and to perform its respective function. In such an example, the mobile device 100 would not need to determine the corresponding touch-sensitive non-display area gesture 130 or its respective function, and thus would require less information about the second electronic device 120.

The touch-sensitive non-display area gestures storage 608 can store information related to the touch-sensitive non-display area 124. In one example, information related to the touch-sensitive non-display area 124 is provided by the second electronic device 120 via the communications subsystem 322. The information stored in the touch-sensitive non-display area gestures storage 608 can be used to determine the instructions for controlling the second electronic device 120.

It will be appreciated that any module, subsystem component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100 or accessible or connectable thereto. Any application or module herein described may be implemented using computer readable/executable instructions or operations that may be stored or otherwise held by such computer readable media.

Figure 8:
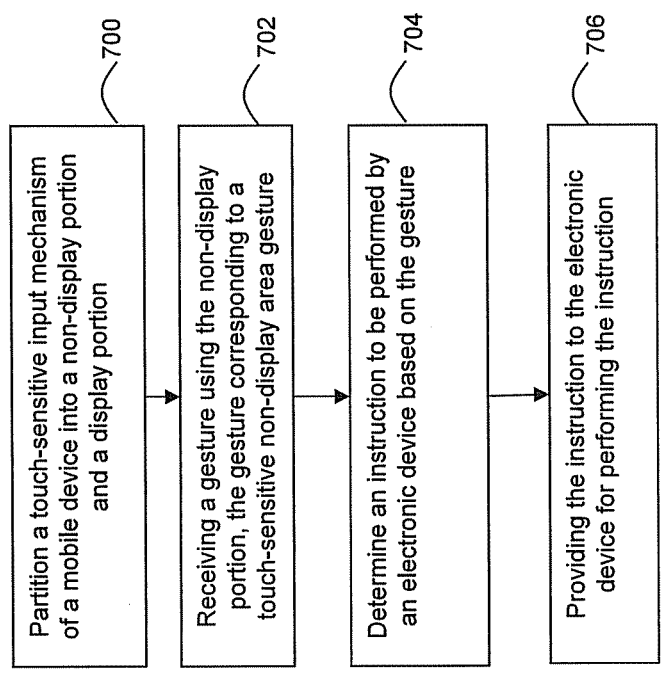
FIG. 8 is a flow diagram of example computer executable instructions for controlling an electronic device having a touch-sensitive non-display area.

Referring to FIG. 8, an example set of computer executable instructions is provided for controlling a second electronic device 120 having a touch-sensitive non-display area 124 using a mobile device 100. The second electronic device 120 in this example has a touch-sensitive non-display area 124 for enabling touch-sensitive non-display area gestures 130. Each touch-sensitive non-display area gesture 130 can be associated with a respective function of the second electronic device 120. At block 700, a touch-sensitive input mechanism (such as the touch-sensitive display area 102) of a mobile device 100 is partitioned into a non-display portion 104 and display portion 106. At block 702, a gesture 132 using the non-display portion 104 is received. The gesture 132 corresponds to a touch-sensitive non-display area gesture 130. At block 704, an instruction to be performed by the second electronic device 120 is determined based on the gesture 132. At block 706, the instruction is provided to the second electronic device for performing the instruction.

As noted above, a touch-sensitive display area 102 of a mobile device 100 may be partitioned into a non-display portion 104 and display portion 106 at block 700. In the example configuration of the device controller application 600 (FIG. 7), the partition module 602 may implement block 700.

It can be appreciated that the touch-sensitive display area 102 can be partitioned into a non-display portion 104 and display portion 106 in various ways. In the example of FIG. 1, the non-display portion 104 has an outer perimeter than lies on the perimeter of the touch-sensitive display area 102 and an inner perimeter indicated by the boundary 108. This partitioning of the touch-sensitive display area 102 provides an intuitive layout when communicating with the second electronic device 120 shown in FIG. 1 as the relative position of the non-display portion 104 with respect to the display portion 106 of the mobile device 100 corresponds to the relative position of the touch-sensitive non-display area 124 relative to the touch-sensitive display area 122 of the second electronic device 124. The mobile device 100 of FIG. 1 can be oriented in a landscape orientation (not shown) such that properties of the non-display portion 104 can more closely resembles the touch-sensitive non-display area 124 of the second electronic device 120.

In one example, partitioning the non-display portion 104 and display portion 106 can be configured by default settings determined by the manufacturer of the mobile device 100 that can be customized by the user. For example, the default setting for a non-display portion 104 can be a border of a predefined thickness surrounding the display portion 106 (see FIG. 1). For example, the thickness of the border can be modified by a user to provide more or less area to perform gestures 132 within the non-display portion 104.

In another example, the partition module 602 of FIG. 7 can request or receive information regarding the touch-sensitive non-display area 124 (such as its shape, size, position and/or orientation in absolute terms or relative to the touch-sensitive display area 122) from the second electronic device 120. The partition module 602 can then use this information to partition the touch-sensitive display area 102 such that the partition more closely resembles the appearance of the second electronic device 120. For example, FIGS. 9-11 provide examples wherein information regarding the second electronic device 120 is used to partition the touch-sensitive display area 102 of the mobile device 100.

Figure 10:
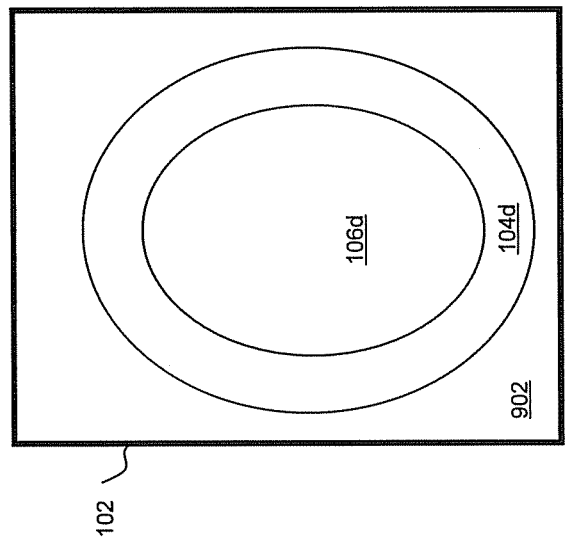
FIGS. 9-11 are plan views of example embodiments of a touch-sensitive display partitioned into a non-display portion and a display portion.
Figure 9:
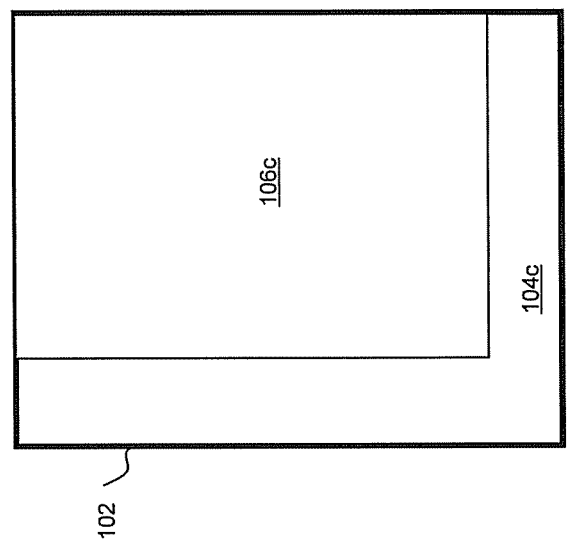
Figure 11:
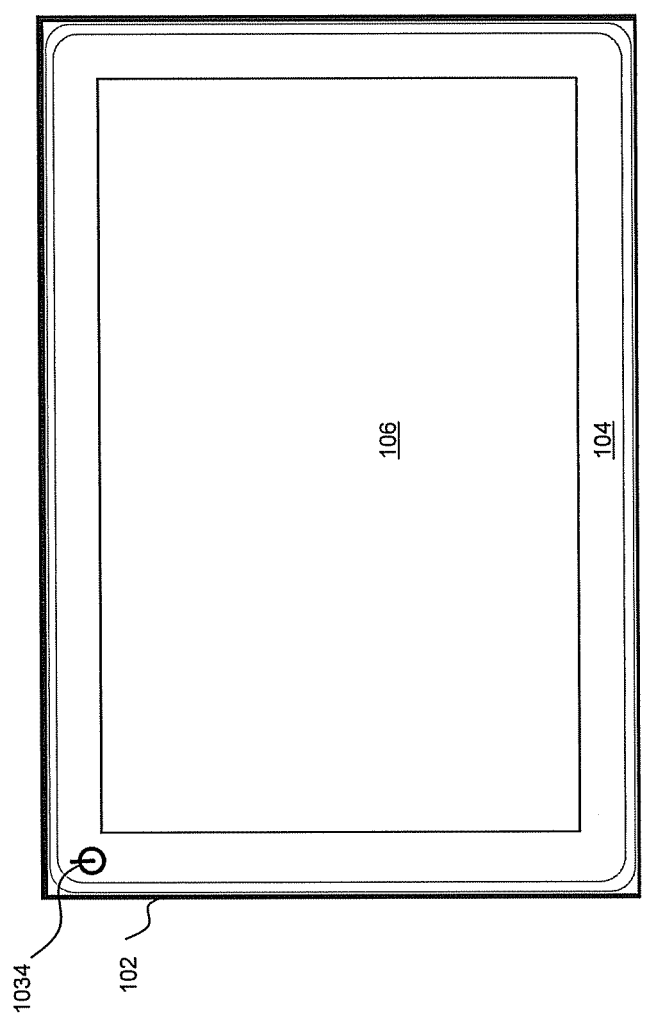

Referring to FIGS. 9 and 10, plan views of examples of a touch-sensitive display area 102 partitioned into non-display portions 104c,104d, and display portions 106c,106d, are provided. In FIG. 9, a touch-sensitive display area 102 is partitioned into non-display portion 104c and display portion 106c to correspond to a second electronic device (not shown) that provides a touch-sensitive non-display area only to the left and bottom of its display. In FIG. 10, a touch-sensitive display area 102 is partitioned into a non-display portion 104d and a display portion 106d to correspond to a second electronic device that has an oval shape (not shown). The touch-sensitive display area 102 of FIG. 10 is also partitioned into a third portion 902 which can be used to display other objects such as additional icons, status indicators, etc. One or more additional portions 902 can provide display area to run other applications or display additional content. This may allow a user to more efficiently use the display area of the touch-sensitive display area 102, for example, when the touch-sensitive display area 102 of the mobile device 100 is larger than the display of the second electronic device 120.

In another example, the partition module 602 of FIG. 7 can also determine the appearance of the non-display portion 104 and/or the display portion 106 in addition to determining its layout. In this example, the partition module 602 can visually distinguish between the non-display portion 104 and the display portion 106 by displaying a visual indicator such as the boundary 108 shown in FIG. 1. For example, the mobile device can fill in the non-display portion 104 with a solid color, a repeating pattern or a specific image. In the example shown in FIG. 11, the touch-sensitive display area 102 of the mobile device 100 would be oriented in a landscape orientation, and the partition module 602 configured to display an image of the touch-sensitive non-display area 124 of the second electronic device 120 in the non-display portion 104. The image of the button 1034 within the image of the touch-sensitive non-display area 124 corresponds to the button 134 of the second electronic device 120, respectively (see FIG. 1). The image of the touch-sensitive non-display area 124 can also be pre-stored on the mobile device 100 or obtained from the second electronic device 120 via the communications subsystem 322.

In another example, the partition module 602 can be configured to provide one or more virtual buttons within the non-display portion 104 corresponding to a virtual or physical button on the touch-sensitive non-display area 124 on the second electronic device 120. For example, the non-display portion 104 of FIG. 11 can be configured such that the image of the button 1034 is selectable (e.g., by detecting a gesture 132 involving a "tapping" or pressing of the touch-sensitive display area 102 at the location of the button 1034), to provide one or more virtual buttons within the non-display portion 104. In this example, the gesture 132 of tapping the virtual button 1034 can correspond to the touch-sensitive non-display area gesture 130 of tapping the corresponding virtual or physical button 134 on the touch-sensitive non-display area 124.

It can be appreciated that the mobile device 100 can be configured to provide a non-display portion 104 having one or more properties such as size, shape, orientation, position, appearance and/or functionality that resemble the touch-sensitive non-display area 124. A non-display portion 104 of the mobile device 100 that closely resembles the touch-sensitive non-display area 124 of the second electronic device 120 can allow a user familiar with using the touch-sensitive non-display area 124 to understand and use the non-display portion 104 with less difficulty.

Referring back to FIG. 8, at block 702, a gesture 132 involving the non-display portion 104 is received by the touch-sensitive display area 102. In an example configuration, block 702 may be implemented by the touch-sensitive display 360 which then passes the gesture 132 to the device controller application 600 (FIG. 7).

At block 704, an instruction to be performed by the second electronic device 120 is determined based on the gesture 132. In an example configuration, block 706 may be implemented using the evaluate gesture module 604 in combination with the device controller module 606. The mobile device 100 may be operable to determine the instruction by including information on the gesture 132 in the instruction, and instructing the second electronic device 120 to determine the touch-sensitive non-display area gesture 130 corresponding to the gesture 132 using the information on the gesture 132. The mobile device 100 may also be operable to instruct the second electronic device 120 to then determine the respective function associated with the corresponding touch-sensitive non-display area gesture 130, and to instruct the second electronic device 120 to perform the respective function once it is determined.

For example, associated with the gesture 132 may include one or more properties such as the duration, start and stop positions, path, orientation, etc. In the example gesture 132 shown in FIG. 1, the gesture information can include the start position C (e.g. within the bottom edge of non-display portion 104), the path (e.g. directly vertical) and the stop position D (within the display portion 106). From this gesture information, the corresponding touch-sensitive non-display area gesture 130 can be determined by mapping the positions C and D on the touch-screen device 102 of the mobile device 100 to positions A and B on the second electronic device 120. The second electronic device can then recognize that the gesture 132 corresponds to a touch-sensitive non-display area gesture 130 comprising of a swipe from the bottom portion of the touch-sensitive non-display area 124 onto the touch-sensitive display area 122 and thus perform its respective function (e.g. minimize one or more applications).

In another example, the gesture information can also include partitioning information of the mobile device 100 such as the dimensions, shape, position and/or orientation of the non-display portion 104 and display portion 106. The second electronic device 120 can generate one or more scaling factors or transformations based on comparing properties of the touch-sensitive non-display area 124 with properties of the non-display portion 104. The second electronic device 120 may then scale or transform one or more properties of the gesture 132 in order to map the gesture 132 to a corresponding touch-sensitive non-display area gesture 130.

In another example, the surface area of the touch-sensitive display area 102 of the mobile device 100 and the surface area of the touch-sensitive non-display area 124 (and enclosed touch-sensitive display area 122) of the second electronic device 120 can be represented by a normalized Cartesian coordinate system. Information on a gesture 132 can then include a set of x-y coordinates along the path of the gesture 132 which can be plotted on the coordinate system of the second electronic device 120 to determine the corresponding touch-sensitive non-display area gesture 130. Similarly, information on a touch-sensitive non-display area gesture 130 can include a set of x-y coordinates along its path which can be plotted on the coordinate system of the mobile device 100 to determine the corresponding gesture 132.

In the above examples, it can be appreciated that the mobile device 100 does not need to determine the touch-sensitive non-display area gesture 130 that corresponds to a gesture 132. The mobile device 10 can instead provide information regarding the gesture 132 for the second electronic device 120 to process.

In another example, the mobile device 100 can determine the instruction by determining the touch-sensitive non-display area gesture 130 corresponding to the gesture 132, determining the respective function associated with the corresponding touch-sensitive non-display area gesture 130, and selecting the instruction to be performing the respective function by the second electronic device. Such an example may be implemented using the evaluate gesture module 604 in combination with the device controller module 606 and touch-sensitive non-display area gesture storage 608 of FIG. 7.

In an example configuration of FIG. 7, the mobile device 100 can store information on the touch-sensitive non-display area gestures 130 supported by the touch-sensitive non-display area 124 of the second electronic device 120 in the touch-sensitive non-display area gestures storage 608. The evaluate gesture module 604 can determine the touch-sensitive non-display area gesture 130 corresponding to the gesture 132 by comparing properties of the gesture 132 to properties of the touch-sensitive non-display area gestures 130 stored in the touch-sensitive non-display area gesture storage 608, and locating a corresponding touch-sensitive non-display area gesture 130 if one or more predetermined properties match.

In another example, information on the dimensions, shape, position and/or orientation of the touch-sensitive non-display area 124 can also be stored in the touch-sensitive non-display area gesture storage 608 such that the mobile device 100 may determine one or more scaling factors or transformations based on comparing properties of the touch-sensitive non-display area 124 with properties of the non-display portion 104. The mobile device 100 may scale or transform one or more properties of the gesture 132 or touch-sensitive non-display area gesture 130 prior to determining a corresponding touch-sensitive non-display area gesture 130. After the corresponding touch-sensitive non-display area gesture 130 is determined, the mobile device 100 determines the respective function associated with the corresponding touch-sensitive non-display area gesture 130 by looking up this information in the touch-sensitive non-display area gestures storage 608. Once the respective function is determined, the mobile device 100 may instruct the second electronic device 120 to perform the respective function. In this example, the second electronic device 120 can be operable without requiring information regarding the gesture 132 and partitioning of the touch-sensitive display area 102 of the mobile device 100 into a non-display portion 104 and display portion 106.

As noted above, at block 706, the instruction determined by the mobile device 100 is provided to the second electronic device 120 for performing the instruction. In an example configuration, block 706 may be implemented by the communication subsystem 322 (FIG. 7)

Figure 12:
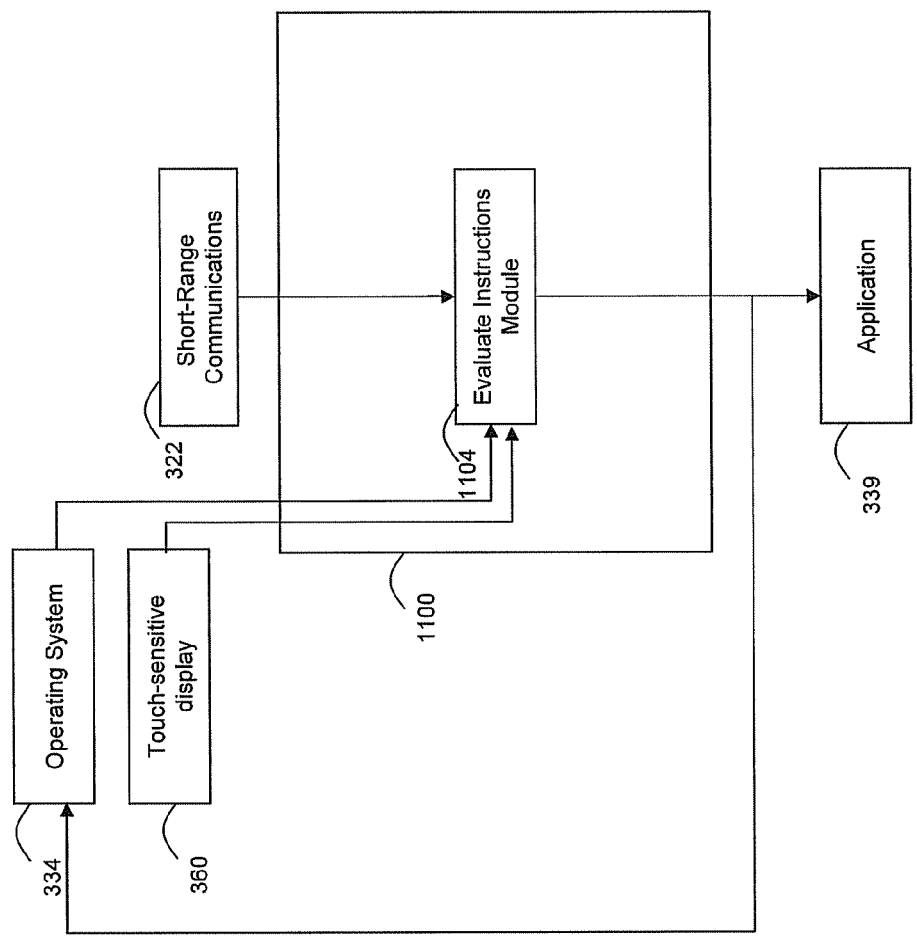
FIG. 12 is a block diagram of an example of a configuration of a touch-sensitive non-display area device controller.

Referring to FIG. 12, an example configuration of a touch-sensitive non-display area device controlled application 1100 (herein referred to as a "device controlled application 1100") is provided. The device controlled application 1100 can be a software application 339 stored on the second electronic device 120 to process touch-sensitive inputs using an instruction from another device. The device controlled application 1100 can request details of activity occurring in, or receive inputs from, a component that receives instructions generated by the device controller application 600, such as the short-range communications subsystem 322 of the second electronic device 120.

The device controlled application 1100 can also receive or obtain information related to the touch-sensitive non-display area gestures 132 supported by the touch-sensitive non-display area 124, and the respective function associated with each touch-sensitive non-display area gesture 132, from one or more components that determine such information. In the example of FIG. 12, the operating system 334 and touch-sensitive display 360 can provide such information to the device controlled application 1100.

The device controlled application 1100 in the example of FIG. 12 includes an evaluate instructions module 1104 for evaluating an instruction provided by the device controller application 600 via the communications subsystem 322. The evaluate instructions module 1104 can then send subsequent instructions to another component of the second electronic device 120 to perform the instruction from the device controller application 600. For example, the instruction from the device controller application 600 may include minimizing open applications to show a system menu in which case the evaluate instructions module 1104 can send subsequent instructions to the application 339 and operating system 334. It will be appreciated that the evaluate instructions module 1104 can directly or indirectly send instructions to other components or subsystems in order to perform the functions directed by the instruction from the device controller application 600.

Referring to FIG. 13, an example set of computer executable instructions is provided for controlling a second electronic device 120 having a touch-sensitive non-display area 124. At block 1200, information on one or more properties of a gesture 132 performed on a mobile device 100 is received by the second electronic device 120. In the example shown in FIG. 12, the communications subsystem 322 may be used to execute block 1200. At block 1202, a corresponding touch-sensitive non-display area gesture 130 using the information on one or more properties of the gesture 132 is determined. At block 1204, a respective function associated with the corresponding touch-sensitive non-display area gesture 130 is determined. In an example configuration, blocks 1202 and 1204 can be implemented by the evaluate instructions module 1104 (FIG. 12). At block 1206, the respective function is performed. In an example configuration, block 1206 can be implemented by the evaluate instructions module 1104 by providing subsequent instructions to the components and subsystems that are required to perform the respective function.

Figure 15:
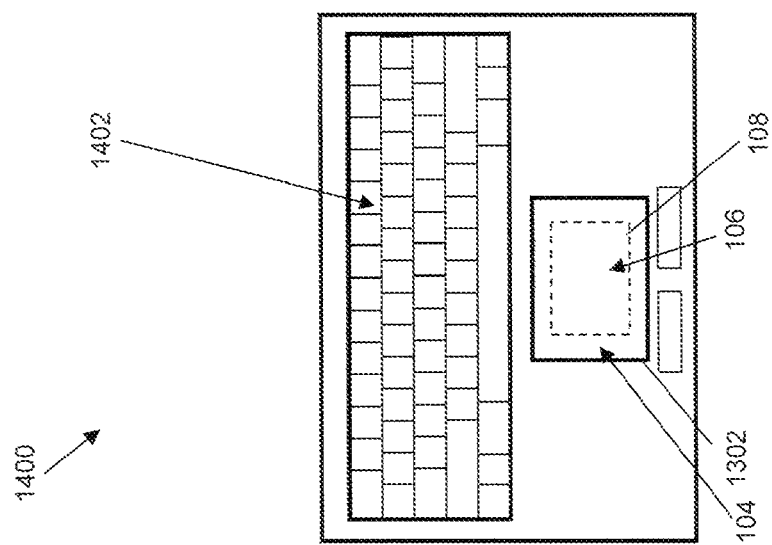
FIG. 15 is a plan view of another example embodiment of a peripheral device.
Figure 14:
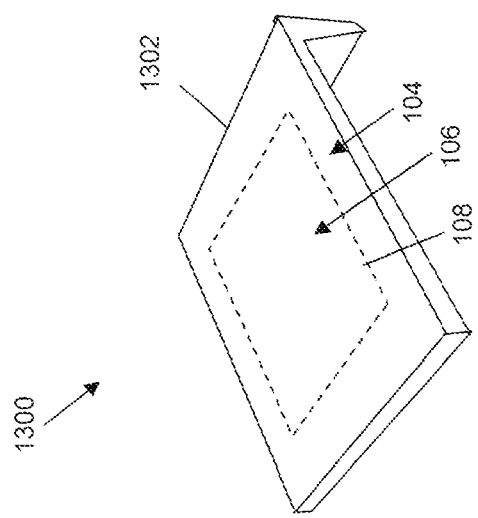
FIG. 14 is a perspective view of an example embodiment of a peripheral device.

It can be appreciated that other electronic devices such as a peripheral device that includes a touch-sensitive input mechanism can be used to control the second electronic device 124. FIGS. 14 and 15 illustrate example peripheral devices 1300, 1400 that include a touch-sensitive input mechanism in the form of a touch pad 1302. The touch pad 1302 can be partitioned into a non-display portion 104 and display portion 106. The boundary 108 between the non-display portion and display portion can be visible or invisible. In an embodiment, the touch pad 1302 can be a stand-alone peripheral device 1300 (FIG. 14). In another embodiment, the touch pad 1302 can be incorporated into a peripheral device 1400 which provides additional input functions (for e.g. a keyboard 1402) (FIG. 15).

Figure 16:
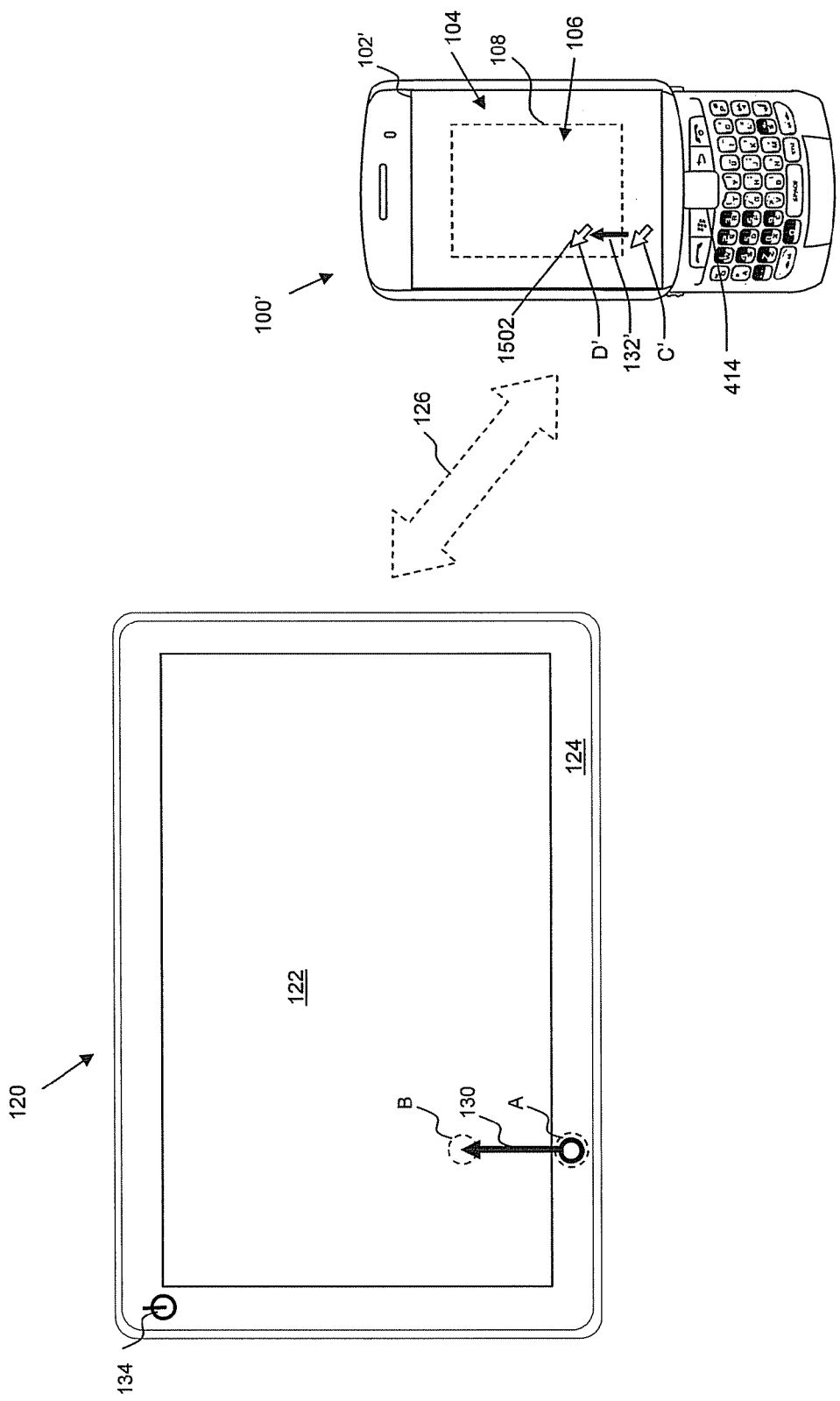
FIG. 16 is a plan view of an another example embodiment of a mobile device in communication with a second electronic device.

It can further be appreciated that the gestures performed on a mobile device 100 do not need to be touch-sensitive gestures provided by a touch-sensitive component. In FIG. 16, a second electronic device 120 (as previously discussed) is in wireless communication with an example mobile device 100' that includes a display area 102' such as a non touch-sensitive display area. In the example shown in FIG. 16, the mobile device 100' can partition the screen 102' into a non-display portion 104 and display portion 106, separated by a boundary 108, as discussed in the previous embodiments. However, in this embodiment, the mobile device 100' can be operable to map a gesture 132', as indicated by the movement of a display cursor 1502, that uses the non-display portion 104 of the mobile device 100 to a corresponding touch-sensitive non-display area gesture 130 of the second electronic device 120. For example, the gesture 132' created by the movement of cursor 1302 from point C' to D' can correspond to the touch-sensitive non-display area gesture 130 from point A to B on the second electronic device 120. Upon receiving gesture 132', the mobile device 100' can determine an instruction to be performed by the second electronic device 120 based on the gesture 132' using the principles previously discussed. It can be appreciated that the display cursor 1502 can be controlled by any one of a number of input mechanism such as a trackpad 414, trackball, or a peripheral mouse connected to the mobile device 100.

It can also be appreciated that similar inputs on the mobile device 100 that correspond to gestures on the second electronic device 120 may be effected without a touch sensitive display area 102 or partitioning of a touch sensitive display area 102. In such an example, any available input mechanism (such as the trackpad 414 shown in FIG. 16) may be used to perform an input that can be mapped to a gesture processed by or on the second electronic device 120.

Figure 17:
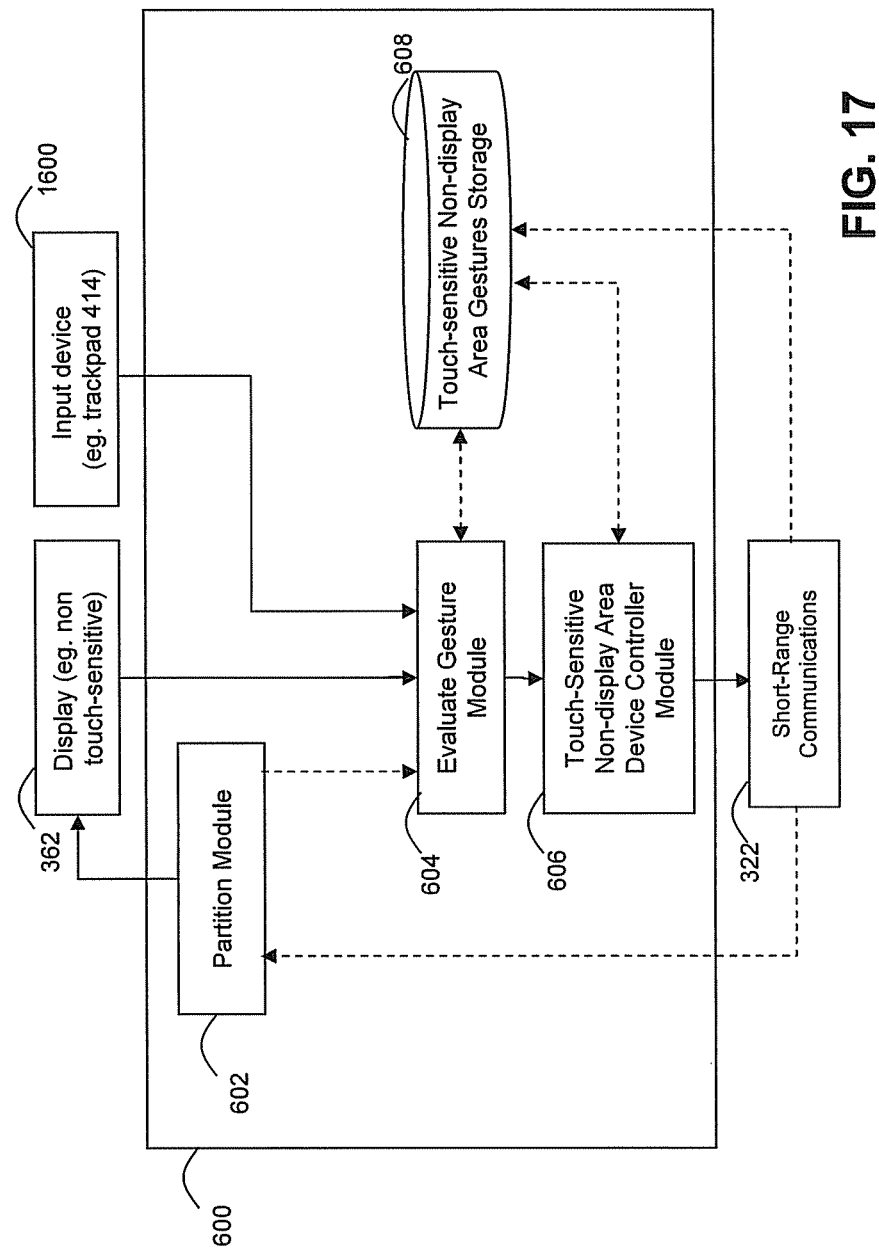
FIGS. 17-19 are block diagrams of examples of other configurations of a touch-sensitive non-display area device controller.

Another example of a device controller application 600 is provided in FIG. 17. In the example device controller application 600 of FIG. 17, the partition module 602 can partition a display area 102' that is not a non touch-sensitive display area into a non-display portion 104 and a display portion 106. Furthermore, the evaluate gesture module 604 can receive gestures 132' that are not touch-sensitive gestures, such as movements of a cursor 1302 provided by an input device 312 such as a trackpad 414.

Figure 18:
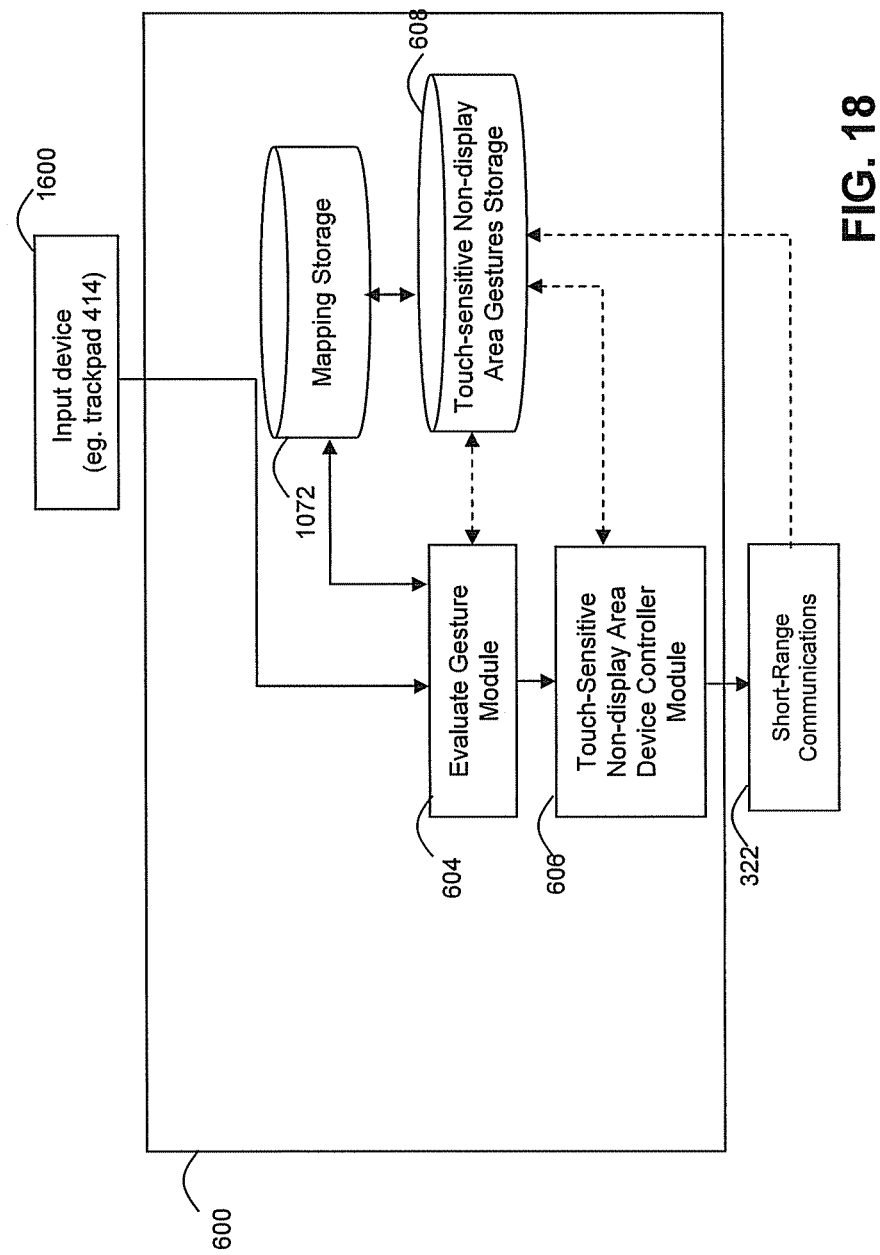

Other electronic devices such as peripheral devices that do not include a touch-sensitive component and/or a display may also be used to control the second electronic device 120. In FIG. 18, another example configuration of a device controller application 600 is provided. In the example device controller application 600 of FIG. 18, the evaluate gesture module 604 can receive gestures in the form of other inputs from an input device 1600. The input device 1600 can be an input mechanism available on the peripheral device such as a keystroke from a keyboard, a button selection from a mouse or gamepad, a voice command from a microphone, a cursor movement from a mouse or trackpad, etc. In this example, a "gesture" is understood to include one of more forms of input to the peripheral device 100 and is not limited to touch-sensitive gestures. Similarly, any suitable input may be mapped to, or otherwise represent, a gesture that would otherwise be performed on the second electronic device 120.

The evaluate gestures module 604 may also associate a gesture to a corresponding touch-sensitive non-display area gesture 130 based on a mapping stored in a mapping storage 1072. The mapping between a particular input gesture to a corresponding touch-sensitive non-display area gesture 130 can be determined by any number of components such as an application 339, operating system 334 or a user. For example the "up arrow" key of a keyboard can be mapped to a swipe gesture 130 from the center of the touch-sensitive display area 122 to the top portion of the touch-sensitive non-display area 124. The corresponding touch-sensitive non-display area gesture 130 can then be sent to the device controller module 606 for determination of the respective function associated with the corresponding touch-sensitive non-display area gesture 130 by looking up this information in the touch-sensitive non-display area gestures storage 608. The device controller module 606 can then instruct the second electronic device 120 to perform the respective function. In another example, the map storage 1072 and touch-sensitive non-display area gestures storage 608 may be combined.

Figure 19:
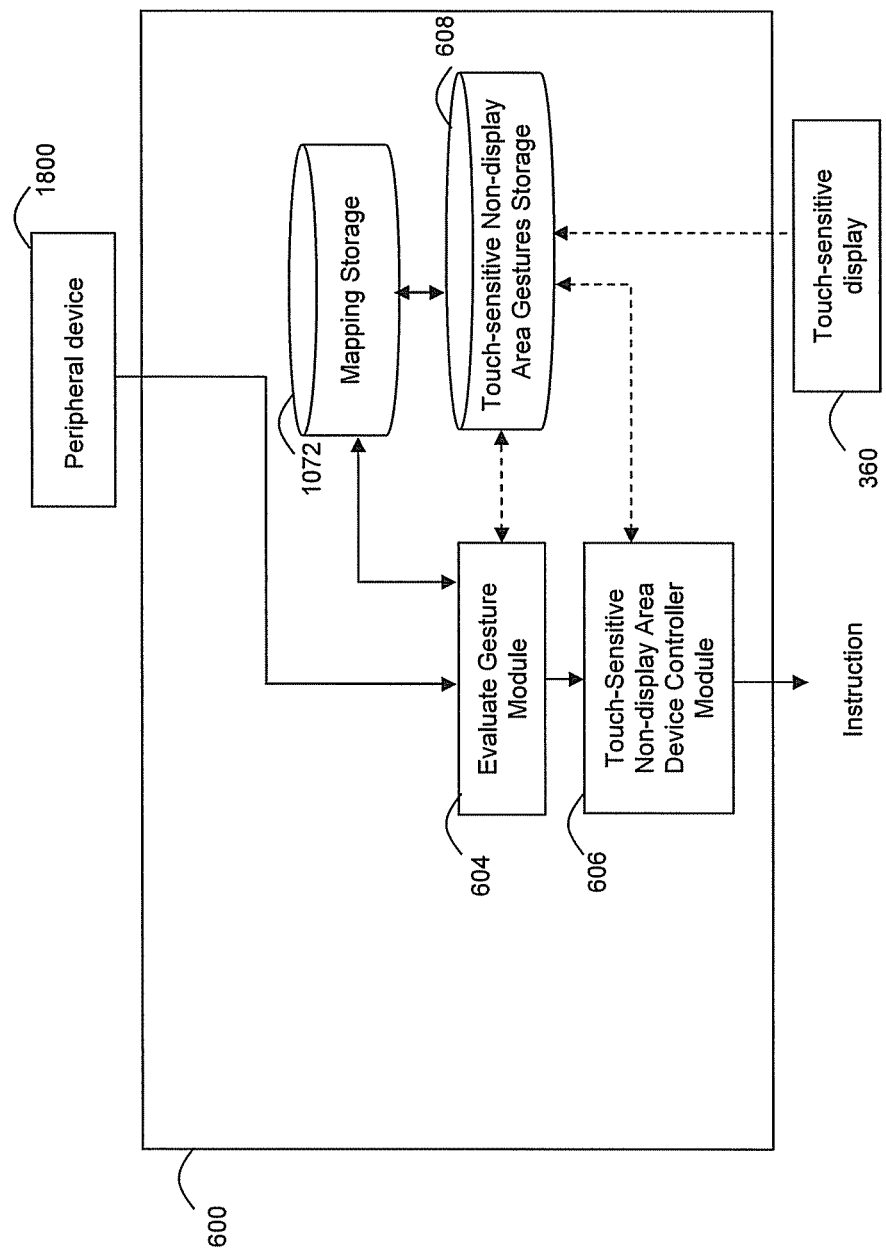

It can be appreciated that in some examples, a partition module 602 may not be required where input gestures are mapped directly to a corresponding touch-sensitive non-display area gesture 130 without simulating a touch-sensitive non-display area (ie. by not providing a non-display portion 104) on the peripheral device. In such examples, the partition module 602 may be absent (as shown in FIGS. 18 and 19) or not used.

It can also be appreciated that one or more of the example configurations of a device controller application 600 can be used by the second electronic device 120. In an example configuration shown in FIG. 19, a device controller application 600 is loaded on the second electronic device 120 and can receive input gestures from a peripheral device 1800 such as a keyboard or mouse connected to the second mobile device 120. In an example wherein the device controller application 600 is loaded on the second electronic device 120, the touch-sensitive non-display area gestures storage 608 can obtain information on the supported touch-sensitive non-display area gestures 130 directly from the touch-sensitive display 360. As discussed above, the evaluate gesture module 604 can map one or more input gestures provided by the peripheral device 1800 to a touch-sensitive non-display area gesture 130. The input or gesture from the peripheral device 1800 can be a key press of the "up arrow", for example. In another example, the peripheral device 1800 can be a mouse and an example input gesture of a mouse cursor at a particular position on the display area 122 in combination with a secondary mouse button press can be mapped to a corresponding touch-sensitive non-display area gesture 130 of swiping from the position of the mouse cursor onto the portion of the touch-sensitive non-display area 124 closest to the position of the mouse cursor. An instruction associated with the corresponding touch-sensitive non-display area gesture 130 can then be determined by the device controller module 606. In an example wherein the device controller application 600 is loaded directly on the second electronic device 120, the instruction that is generated from the device controller module 606 can be sent directly to the component of the second electronic device 120 that is to perform the instruction.

Furthermore, it can be appreciated that the touch-sensitive display area 122 and touch-sensitive non-display area 124 can be implemented in a common touch-sensitive display 360 having a display area 506 and a non-display area 508 (FIGS. 5 and 6). In another example, the touch-sensitive display area 122 and touch-sensitive non-display area 124 can be separate touch-sensitive components.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific example embodiments, various modifications thereof will be apparent to those skilled in the art as outlined in the appended claims.

The invention claimed is:

1. A method of operating a second electronic device, the second electronic device connectable to a first electronic device, the first electronic device comprising a touch-sensitive non-display area for detecting one or more touch-sensitive non-display area gestures, each touch-sensitive non-display area gesture being associated with a respective function of the first electronic device, the method comprising the second electronic device:
    partitioning a touch-sensitive input mechanism of the second electronic device into a non-display portion and a display portion, the non-display portion corresponding to a transformation of the touch-sensitive non-display area of the first electronic device such that the non-display portion is provided along an outer perimeter of the touch-sensitive input mechanism;
    receiving a gesture using the non-display portion, the gesture corresponding to a touch-sensitive non-display area gesture; and
    determining an instruction to be performed by the first electronic device based on the gesture.

2. The method of claim 1, further comprising:
    providing the instruction to the first electronic device for performing the respective function.

3. The method of claim 1, wherein determining the instruction comprises:
    determining the corresponding touch-sensitive non-display area gesture;
    determining the respective function associated with the corresponding touch-sensitive non-display area gesture; and
    selecting the instruction to perform the respective function.

4. The method of claim 1, wherein the instruction includes information on one or more properties of the gesture.

5. The method of claim 4, wherein the instruction comprises:
    determining the corresponding touch-sensitive non-display area gesture using the information on one or more properties of the gesture;
    determining the respective function associated with the corresponding touch-sensitive non-display area gesture; and
    performing the respective function.

6. The method of claim 1, wherein the gesture uses both the non-display portion and the display portion.

7. The method of claim 6, wherein the gesture comprises swiping from within one of the non-display portion and display portion onto the other of the non-display portion and display portion.

8. The method of claim 1, wherein the non-display portion is partitioned based on one or more properties of the touch-sensitive non-display area.

9. The method of claim 1, wherein the non-display portion surrounds the display portion.

10. The method of claim 1, wherein the touch-sensitive input mechanism is a touch-sensitive display.

11. The method of claim 10, wherein the non-display portion is visually distinguished from the display portion by any one or more of the following: displaying a border in between the non-display portion and display portion, and displaying the non-display portion as a solid color, a repeating pattern or an image.

12. The method of claim 10, wherein one or more virtual buttons are provided within the non-display portion, each virtual button corresponding to a respective button on the touch-sensitive non-display area of the first electronic device.

13. The method of claim 1, wherein the touch-sensitive input mechanism is a touch pad.

14. The method of claim 1, wherein the respective function of the first electronic device comprises any one or more of the of following:
   minimizing or maximizing an application;
   showing or hiding a menu, status bar or virtual keyboard;
   switching between one or more applications; and
   turning the first electronic device on or off.

15. The method of claim 1, wherein one or more properties of the non-display portion is configurable by a user of the second electronic device.

16. A non-transitory computer readable storage medium for operating a second electronic device, the second electronic device connectable to a first electronic device, the first electronic device comprising a touch-sensitive non-display area for detecting one or more touch-sensitive non-display area gestures, each touch-sensitive non-display area gesture associated with a respective function of the first electronic device, the computer readable storage medium comprising computer executable instructions for:
   partitioning a touch-sensitive input mechanism of the second electronic device into a non-display portion and a display portion, the non-display portion corresponding to a transformation of the touch-sensitive non-display area of the first electronic device such that the non-display portion is provided along an outer perimeter of the touch-sensitive input mechanism;
   receiving a gesture using the non-display portion, the gesture corresponding to a touch-sensitive non-display area gesture; and
   determining an instruction to be performed by the first electronic device based on the gesture.

17. The non-transitory computer readable storage medium of claim 16 further comprising computer executable instructions for:
   providing the instruction to the first electronic device for performing the instruction.

18. The non-transitory computer readable storage medium of claim 16, wherein determining the instruction comprises:
   determining the corresponding touch-sensitive non-display area gesture;
   determining the respective function associated with the corresponding touch-sensitive non-display area gesture; and
   selecting the instruction perform the respective function.

19. The non-transitory computer readable storage medium of claim 16, wherein the instruction includes information on one or more properties of the gesture.

20. The non-transitory computer readable storage medium of claim 19, wherein the instruction comprises:
   determining the corresponding touch-sensitive non-display area gesture using the information on one or more properties of the gesture;
   determining the respective function associated with the corresponding touch-sensitive non-display area gesture; and
   performing the respective function.

21. The non-transitory computer readable storage medium of claim 16, wherein the gesture uses both the non-display portion and the display portion.

22. The non-transitory computer readable storage medium of claim 21, wherein the gesture comprises swiping from within one of the non-display portion and display portion onto the other of the non-display portion and display portion.

23. The non-transitory computer readable storage medium of claim 16, wherein the non-display portion is partitioned based on one or more properties of the touch-sensitive non-display area.

24. The non-transitory computer readable storage medium of claim 16, wherein the non-display portion surrounds the display portion.

25. The non-transitory computer readable storage medium of claim 16, wherein the touch-sensitive input mechanism is a touch-sensitive display.

26. The non-transitory computer readable storage medium of claim 25, wherein the non-display portion is visually distinguished from the display portion by any one or more of the following: displaying a border in between the non-display portion and display portion, and displaying the non-display portion as a solid color, a repeating pattern or an image.

27. The non-transitory computer readable storage medium of claim 25, wherein one or more virtual buttons are provided within the non-display portion, each virtual button corresponding to a respective button on the touch-sensitive non-display area of the first electronic device.

28. The non-transitory computer readable storage medium of claim 16, wherein the touch-sensitive input mechanism is a touch pad.

29. The non-transitory computer readable storage medium of claim 16, wherein the respective function of the first electronic device comprises any one or more of:
   minimizing or maximizing an application;
   showing or hiding a menu, status bar or virtual keyboard;
   switching between one or more applications; and
   turning the first electronic device on or off.

30. The non-transitory computer readable storage medium of claim 16, wherein one or more properties of the non-display portion is configurable by a user of the second electronic device.

31. A device for controlling a first electronic device connectable to the device, the first electronic device comprising a touch-sensitive non-display area for detecting one or more touch-sensitive non-display area gestures, each touch-sensitive non-display area gesture associated with a respective function of the first electronic device, the device comprising a processor, non-transitory memory and a touch-sensitive input mechanism, the non-transitory memory storing computer executable instructions for:
   partitioning the touch-sensitive input mechanism into a non-display portion and a display portion, the non-display portion corresponding to a transformation of the touch-sensitive non-display area of the first electronic device such that the non-display portion is provided along an outer perimeter of the touch-sensitive input mechanism;
   receiving a gesture using the non-display portion, the gesture corresponding to a touch-sensitive non-display area gesture; and
   determining an instruction to be performed by the first electronic device based on the gesture.

32. The device of claim 31, wherein the touch-sensitive input mechanism comprises a touch-sensitive display.

33. The device of claim 31, wherein the touch-sensitive input mechanism comprises a touch pad.

34. The device of claim 31, further comprising computer executable instructions for:
   providing the instruction to the first electronic device for performing the respective function.

35. The device of claim 31, wherein determining the instruction comprises:
   determining the corresponding touch-sensitive non-display area gesture;
   determining the respective function associated with the corresponding touch-sensitive non-display area gesture; and
   selecting the instruction to perform the respective function.

36. The device of claim 31, wherein the instruction includes information on one or more properties of the gesture.

37. The device of claim 36, wherein the instruction comprises:
   determining the corresponding touch-sensitive non-display area gesture using the information on one or more properties of the gesture;
   determining the respective function associated with the corresponding touch-sensitive non-display area gesture; and
   performing the respective function.

38. The device of claim 31, wherein the gesture uses both the non-display portion and the display portion.

39. The device of claim 38, wherein the gesture comprises swiping from within one of the non-display portion and display portion onto the other of the non-display portion and display portion.

40. The device of claim 31, wherein the non-display portion is partitioned based on one or more properties of the touch-sensitive non-display area.

41. The device of claim 31, wherein the non-display portion surrounds the display portion.

42. The device of claim 31, wherein the touch-sensitive input mechanism is a touch-sensitive display.

43. The device of claim 42, wherein the non-display portion is visually distinguished from the display portion by any one or more of the following: displaying a border in between the non-display portion and display portion, and displaying the non-display portion as a solid color, a repeating pattern or an image.

44. The device of claim 42, wherein one or more virtual buttons are provided within the non-display portion, each virtual button corresponding to a respective button on the touch-sensitive non-display area of the first electronic device.

45. The device of claim 31, wherein the touch-sensitive input mechanism is a touch pad.

46. The device of claim 31, wherein the respective function of the first electronic device comprises any one or more of:
   minimizing or maximizing an application;
   showing or hiding a menu, status bar or virtual keyboard;
   switching between one or more applications; and
   turning the first electronic device on or off.

47. The device of claim 31, wherein one or more properties of the non-display portion is configurable by a user of the device.

48. A method of operating a first electronic device, the first electronic device connectable to a second electronic device, the first electronic device comprising a touch-sensitive non-display area for detecting at least one touch-sensitive non-display area gesture interacting with the touch-sensitive non-display area, the second electronic device comprising a touch-sensitive input mechanism partitioned into a non-display portion corresponding to a transformation of the touch-sensitive non-display area of the first electronic device such that the non-display portion is provided along an outer perimeter of the touch-sensitive input mechanism, the method comprising the first electronic device:
   receiving an input from the second electronic device that is determined from a gesture using the non-display portion, the input representing one of the at least one touch-sensitive non-display area gesture; and
   executing a function corresponding to the one of the at least one touch-sensitive non-display area gesture.

* * * * *